(12) United States Patent
Aiken (10) Patent No.: US 9,528,715 B2
(45) Date of Patent: Dec. 27, 2016

(54) OCCUPANCY-BASED DEMAND CONTROLLED VENTILATION SYSTEM

(76) Inventor: Thomas David Aiken, Basking Ridge, NJ (US)

(*) Notice: Subject to any disclaimer, the term of this patent is extended or adjusted under 35 U.S.C. 154(b) by 1633 days.

(21) Appl. No.: 12/591,803

(22) Filed: Dec. 2, 2009

(65) Prior Publication Data

US 2011/0127340 A1      Jun. 2, 2011

(51) Int. Cl.
*F24F 7/00* (2006.01)
*F24F 11/00* (2006.01)
*G05B 15/02* (2006.01)

(52) U.S. Cl.
CPC ........ *F24F 11/0001* (2013.01); *F24F 11/0034* (2013.01); *G05B 15/02* (2013.01)

(58) Field of Classification Search
CPC .................................... F24F 11/0001
USPC .......................... 454/254, 256, 258; 700/276
See application file for complete search history.

(56) References Cited

U.S. PATENT DOCUMENTS

| | | | |
|---|---|---|---|
| 5,156,203 A | 10/1992 | Funakoshi et al. | |
| 6,348,867 B1 | 2/2002 | Myllymaki | |
| 6,916,239 B2* | 7/2005 | Siddaramanna et al. | 454/256 |
| 6,927,687 B2 | 8/2005 | Carrender | |
| 6,988,071 B1 | 1/2006 | Gazdzinski | |
| 7,511,613 B2 | 3/2009 | Wang | |
| 7,545,267 B2 | 6/2009 | Stortoni | |
| 7,948,189 B2 | 5/2011 | Ahmed | |
| 8,909,382 B1 | 12/2014 | Malakuti | |
| 2006/0022801 A1* | 2/2006 | Husak et al. | 340/10.5 |
| 2008/0048826 A1 | 2/2008 | Agrawal et al. | |
| 2008/0076346 A1* | 3/2008 | Ahmed | 454/256 |

FOREIGN PATENT DOCUMENTS

JP   2008281239 A   * 11/2008

OTHER PUBLICATIONS

Promising Technology: Wireless Lighting Occupancy Sensors, Department of Energy, Office Of Energy Efficiency & Renewable Energy, http://www.energy.gov/eere/femp/promising-technology-wireless-lighting-occupancy-sensors, Jan. 4, 2016.
SPEED, State Partnership for Energy Efficient Demonstrations, Adaptive Corridor Lighting, University of California, San Francisco, Apr. 2014.
Brons, Jennifer, Field Test DELTA, T5 Fluorescent High-Bay Luminaires and Wireless Lighting Controls, Lighting Research Center, Issue 3, Rensselaer Polytechnic Instutute, Dec. 2008.
Wei, J.; Rubinstein, F., et al., Wireless Advanced Lighting Controls Retrofit Demonstration, Lawrence Berkeley National Laboratory, Apr. 2015.

(Continued)

*Primary Examiner* — Alissa Tompkins
*Assistant Examiner* — Brittany Towns
(74) *Attorney, Agent, or Firm* — Lerner, David, Littenberg, Krumholz & Mentlik, LLP (57) ABSTRACT

In a demand control ventilation (DCV) system, ID codes of tags worn by occupants are detected in each room by a tag detector and wirelessly communicated to a zonal occupancy compiler. The zonal occupancy count arrived at by the compiler is transmitted to a DCV microprocessor, which interfaces with the ventilation controller of the building's HVAC system and sets the zonal ventilation rate based on the occupancy count and applicable ASHRAE standards.

8 Claims, 4 Drawing Sheets

(56) References Cited

OTHER PUBLICATIONS

EOPC-100 Wireless RF PIR Occupancy Sensor, WattStopper, Pub. No. 39201, Aug. 2013.
Thermokon, Sensortechnik GmbH, SR-MDS, Wireless Ceiling Multi Sensor 360°, 2010.
DT-300 Series Low Voltage Dual Technology Ceiling Sensors, WattStopper, Pub. No. 14909, May 2013.

\* cited by examiner

OCCUPANCY-BASED DEMAND CONTROLLED VENTILATION SYSTEM

BACKGROUND OF THE INVENTION

The present invention relates to the field of HVAC systems and more particularly to the field of ventilation systems for buildings. The present invention specifically addresses demand-controlled ventilation (DCV) systems, in which the ventilation rate is determined based on actual occupancy levels in the ventilated zones, rather than default occupancy levels.

Both environmental and economic concerns in recent years have driven a move toward conserving energy by adjusting the rate of ventilation in various zones of a building to the actual demand for ventilation based on occupancy of the zone. ASHRAE ventilation standards now provide algorithms for adjusting ventilation rates based on occupancy in order to reduce energy consumption when demand falls below default levels. Systems have been developed that estimate occupancy based on levels of carbon dioxide measured in the ventilated space. But these $CO_2$-based systems have several disadvantages, including the reliability and accuracy of the $CO_2$ monitors and the costs associated with installing and maintaining them.

The present invention proposes an alternate method of determining the occupancy level of a ventilated space by monitoring ingress into and egress from the space. Active or passive identification tags incorporated in identification badges worn by building occupants are used to actually count the number of occupants of a given space, and that occupancy information is then relayed to a microprocessor-based control unit which applies the relevant ASHRAE (American Society of Heating, Refrigerating and Air Conditioning Engineers) algorithm to compute the required ventilation rate. The control unit is interfaced with the building HVAC (heating, ventilating and air conditioning) system so as to adjust ventilation rates in each zone in accordance with the computed occupancy-based demand.

The prior art in this field includes some systems that use radio frequency identification (RFID) tags to monitor occupancy of a zone and others that use active RFID tags to set different parameters of an HVAC system directly, in accordance with the needs of the person or product to which the tag is attached. But none of the prior art systems has the capability of automatically adjusting ventilation rates based on detected occupancy levels.

The patent issued to Stortoni, U.S. Pat. No. 7,545,267, discloses a system in which RFID tags attached to climate-sensitive products signal a transponder in the storage area, which transponder signals one or more building control systems (such as HVAC) to adjust to the product's optimal environment. This system is not designed to address occupancy-based demand-controlled ventilation (DCV) and is not adaptable to that purpose. The Stortoni system requires expensive and bulky active RFID tags having substantial internal data content which serve no purpose in the DCV context.

The patent of Carrender, U.S. Pat. No. 6,927,687, discloses an apparatus that uses RFID tags and readers to monitor environmental conditions in a given area. The functions of this apparatus are unrelated to determining occupancy and/or controlling area ventilation rates.

The patent to Gazdzinski, U.S. Pat. No. 6,988,071, describes a "smart elevator" system that keeps track of occupancy levels in elevator car and/or destination floors by detecting RFID tags carried by passengers. While there is an embodiment of this system that involves control of HVAC in areas of the destination floor, this control is exercised by the elevator passenger manually activating a key pad or touch screen within the elevator. Therefore, the function of automatically setting ventilation levels in areas based on RFID-detected occupancy is not addressed.

The patent application of Agrawal, et al., US 2008/0048826, involves a system that uses an RFID badge to track an occupant's movement through an area and automatically disable certain hazards in the occupant's path for safety purposes. No means of counting occupants in the area or using that data to control ventilation rates is disclosed.

The patent issued to Myllymaki, U.S. Pat. No. 6,348,867, is a system that automates building control systems in accordance with an occupant's physiological condition as monitored by a wrist-held sensor. Occupancy-based DCV is not an object of this invention.

The patent of Funakoshi, et al., U.S. Pat. No. 5,156,203, discloses an air conditioning system that adjusts itself in response to preferred settings recorded on a "smart" ID card carried by the occupant. While automatic HVAC control is featured, it is not demand-controlled based on an occupancy count.

Consequently, the prior art discloses various "smart" tag systems that actively transmit internally stored data used directly for adjusting one or more HVAC settings. The prior art also discloses a system that uses passive tags to count occupants in a confined area. Combining these two types of systems is problematic, since the former require sophisticated active tags, while the latter uses simple passive tags. Even if they could be combined, however, the resulting system would still lack a means of compiling the occupancy data by ventilation zones and converting the compiled zonal data into ventilation control parameters.

The present invention bridges this gap in the prior art by providing a four-stage process by which tagged ID badges are detected in each room by a tag detector, and the tag IDs are wirelessly communicated to a zonal occupancy compiler. The zonal occupancy count arrived at by the compiler is wirelessly transmitted to a central DCV microprocessor, which interfaces with the ventilation controller of the building's HVAC system and sets the zonal ventilation rate based on the occupancy count and applicable ASHRAE standards.

The functional design of this process and the implementing apparatus will be outlined in the following section of this application, and then a more detailed description of two preferred embodiments of the invention will be presented, with the understanding that numerous alternate embodiments can be realized within the scope of the broad functional design.

SUMMARY OF THE INVENTION

From a process standpoint, the present invention comprises the following steps:
1. Assigning a wearable ID-coded passive or active tag to each building occupant and visitor;
2. Providing in each room a tag detector that detects each occupant tag within the room and causes the ID-code associated with each detected tag to be wirelessly transmitted to a zonal occupancy compiler, either by the detector itself, in the case of passive tags, or by the tag itself, if it is an active tag;
3. Providing in each ventilation zone of the building a zonal occupancy compiler, which receive the ID-code transmission from the tag detectors of all rooms within the zone, and next, after discounting redundant ID-codes, computes an occupancy count for the zone, and then transmits the zonal occupancy count to a central DCV microprocessor; and 4. Providing a central DCV microprocessor that receives the zonal occupancy count from each zone in the building and, depending on the type of use in the zone, computes a ventilation rate for the zone, and then implements that ventilation rate through an interface with the ventilation rate controls of the building HVAC system.

To minimize cost and bulk, the occupant tags are preferably passive tags or active tags with limited data storage. Most conveniently, the tags would be incorporated in badges worn by all building occupants. Each tag would have a remotely-scannable/transmittable identification code. People working in the building would be assigned a permanent badge with their own ID code, while visitors would receive ID-coded badges upon checking in with building security. ID-codes enable the system to avoid multiple counting of one individual as he/she moves from one room to another.

While the tag detectors located in each room optimally use either infrared (IR) or RFID detection, the system can utilize any form of wireless communication between the tag detectors and the ID-coded badges, including Wi-Fi, optical and/or laser signals. Depending on the size and configuration of the room, multiple tag detectors can be deployed if needed. Preferably, the tag detectors can be focused to avoid detection of tags outside the assigned room. One or more rooms are grouped together in zones corresponding to a common ventilation sub-system. In each zone, the zonal occupancy compiler communicates wirelessly with each of the passive tag detectors or active tags, preferably by radio frequency (RF) signal, but alternately by IR, Wi-Fi, optical and/or laser signals.

Figure 1:
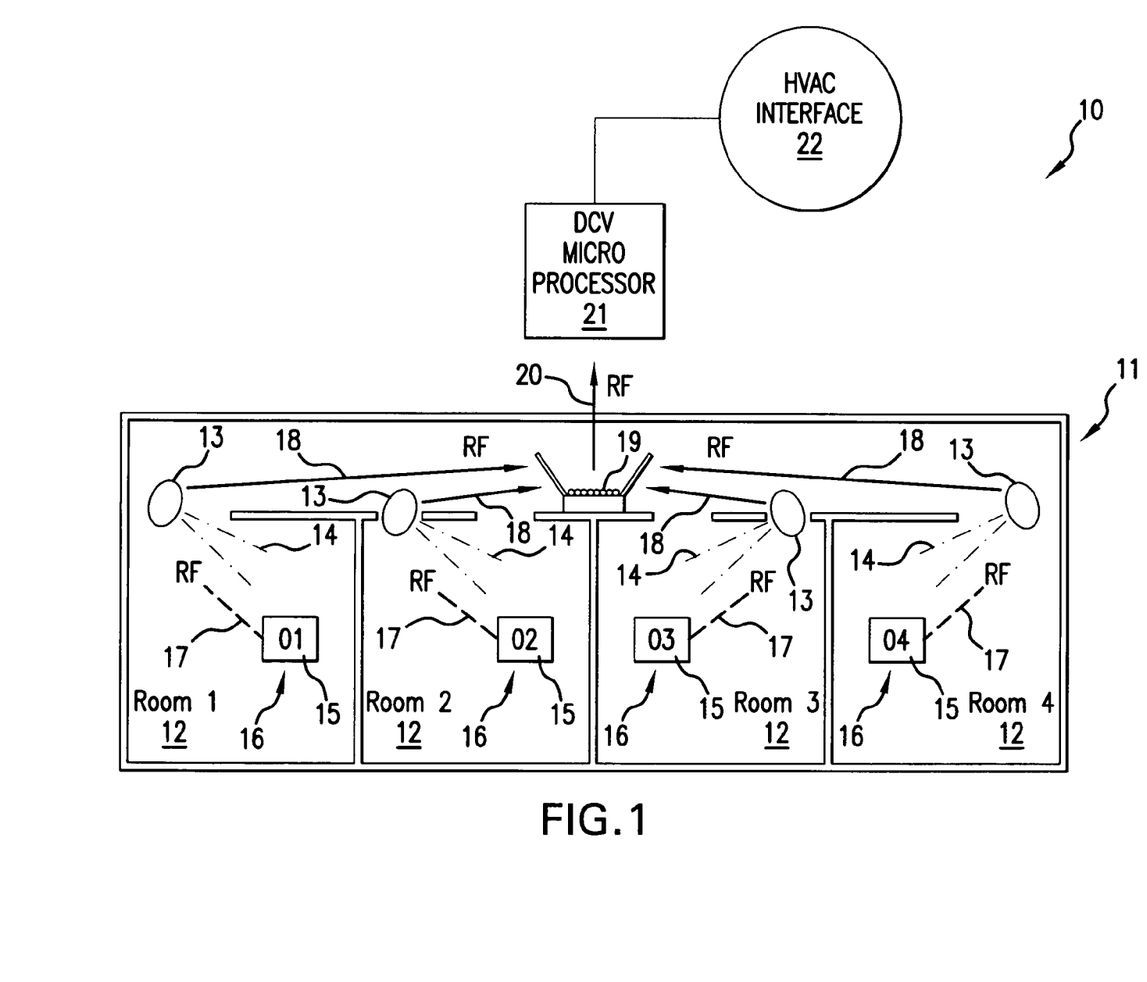
FIG. 1 is a schematic diagram of the apparatus of the passive tag preferred embodiment of the present invention.

As an illustrative example, referring to FIG. 1, consider a ventilation zone comprising four offices, designated Rooms 1-4. Each room has one occupant, each of whom wears a badge with a passive RFID tag. The four tags are assigned ID codes O1-O4. At 9 a.m., each occupant is in his/her own office, and his/her tag is detected by a tag reader in that office. The zonal compiler receives from the four tag readers four ID codes, one per room, and establishes an occupancy count of four for the zone. At 10 a.m., occupant O1 briefly leaves Room 1, hands a memo to occupant O2 in Room 2, then returns to his/her own office. When the compiler receives from the tag reader of Room 2 a detection of two tags, it compares the ID codes with those previously counted and eliminates the redundant count for occupant O1, thereby maintaining the correct total occupancy count of four.

At designated intervals, the zonal occupancy compiler sends its occupancy count to the central DCV microprocessor. The DCV microprocessor takes the occupancy count for each zone and applies the appropriate algorithm based on the current ASHRAE standard or other relevant HVAC codes. Revisiting our illustrative office example, let's say that at 11 a.m. each of the four occupants has one visitor, each wearing an ID badge. Four employee ID codes and four visitor ID codes will be detected by the tag readers in Rooms 1-4, and the occupancy compiler will generate a count of eight occupants for the zone.

The DCV microprocessor would then apply the current ASHRAE ventilation standard 62.1, based on the following algorithm:

$$V_{bz}=(R_p \times P_z)+(R_a \times A_z)$$

Where:
$V_{bz}$=breathing-zone ventilation rate, in cubic feet per minute (cfm)
$R_p$=required outdoor airflow rate per person, in cfm
$P_z$=zone population, in number of occupants
$R_a$=required outdoor airflow rate per unit floor area, in cfm per square foot (cfm/sf)
$A_z$=zone floor area, in square feet (sf)

From Table 6.1 of the ASHRAE standard, the required occupancy airflow rate $R_p$ for office use is 5 cfm per person, while the required floor area airflow rate $R_a$ for office space is 0.06 cfm/sf. Therefore, in our example, if the area of each of the four offices is 1000 sf, the DCV microprocessor will compute the ventilation rate $V_{bz}$ as follows:

$$V_{bz}=(5 \times 8)+(0.06 \times 4000)=40+240=280 \text{ cfm}$$

The required ventilation rate of 280 cfm is then implemented for the zone in question through an interface between the DCV microprocessor and the building HVAC system controller.

It's noteworthy that, in the absence of such occupancy-based demand-controlled ventilation adjustments, the ventilation rate would be set, under ASHRAE standards, by a default occupancy rate, which for offices is five persons per 1000 square feet. So in our example, the default occupancy would be twenty persons, which would result in a ventilation rate of 340 cfm, an increase of over 20% over the occupancy-based ventilation rate. The difference is even greater if we consider a situation, let's say during lunchtime, when only two of the four occupants are in their offices. The occupancy-based DCV ventilation rate would then be only 250 cfm, and the default rate of 340 cfm would be 36% greater.

Consequently, the present invention affords significant energy efficiencies not enabled by the prior art in this field. Moreover, this system is relatively inexpensive and simple to implement, unlike systems requiring $CO_2$ monitoring and/or sophisticated active tags.

Having described the general concepts of the present invention, it is understood that the invention may be realized in a number of possible embodiments. While two of these embodiments have been selected to illustrate in more concrete form how this invention may be practiced, it is understood that the following detailed description is presented for exemplary purposes only and does not limit the scope of the present invention or the claims made in relation thereto.

DETAILED DESCRIPTION OF THE PREFERRED EMBODIMENTS

FIG. 1 depicts a schematic apparatus configuration of the first preferred embodiment of the present invention 10, which uses passive tags. For illustrative purposes, this figure focuses on one ventilation zone 11 of a building that has multiple ventilation zones. The same basic apparatus configuration would be replicated in the other ventilation zones of the building. The exemplary ventilation zone 11 comprises four rooms 12, which are labeled Rooms 1-4. Obviously, depending on the floor plan and ventilation system of the building, each ventilation zone 11 can have more or fewer rooms 12 than are depicted in this figure. Hence, the number of rooms 12 indicated here is for illustrative purposes only.

In each room 12, there are one or more detectors that are tag readers 13. Preferably, there is one tag reader 13 per room 12, but multiple tag readers 13 may be required for rooms that are very large and/or have very complex configurations. In the preferred embodiment 10, the tag reader(s) 13 in each room 12 continuously transmit(s) RF search signals 14 throughout the room 12. The search signals 14 are detected by passive RFID tags 15 implanted in ID badges 16 issued to all building occupants and visitors. The RFID tags 15 respond to the search signals 14 by transmitting RF tag signals 17 back to the tag reader 13. The tag signal 17 for each RFID tag 15 transmits a digital ID code assigned to the particular ID badge 16 in which the RFID tag 15 is implanted. The tag reader(s) 13 then compile a running list of ID codes associated with the RFID tags 15 that are present in the room 12.

The tag reader(s) 13 in each room 12 at specified intervals transmit(s) RF reader signal(s) 18 to a zonal compiler 19 that is assigned to the ventilation zone 11 in which the room 12 is located. Each reader signal 18 transmits two digital codes: first, a room code uniquely identifying the room 12 in which the tag reader 13 is located, and second, the ID code of each RFID tags 15 detected in that room 12 during that interval. Using this data, the zonal compiler 19 registers a zonal occupancy count based on the number of ID codes received, discounting redundant ID codes. The zonal compiler 19 then transmits the zonal occupancy counts digitally via an RF compiler signal 20 sent to a central demand control ventilation (DCV) microprocessor 21. The DCV microprocessor 21 wirelessly interfaces with the zonal compilers 19 of all the ventilation zones 11 within the building.

Using the zonal occupancy count received from each zonal compiler 19, the DCV microprocessor 21 computes the demand ventilation rate based on the applicable ASHRAE algorithms and standards for the use(s) associated each ventilation zone 11. The DCV microprocessor 21 then relays or transmits the computed ventilation rate to an HVAC interface 22, which interfaces with the building HVAC system so as to implement the demand ventilation rate.

Figure 2:
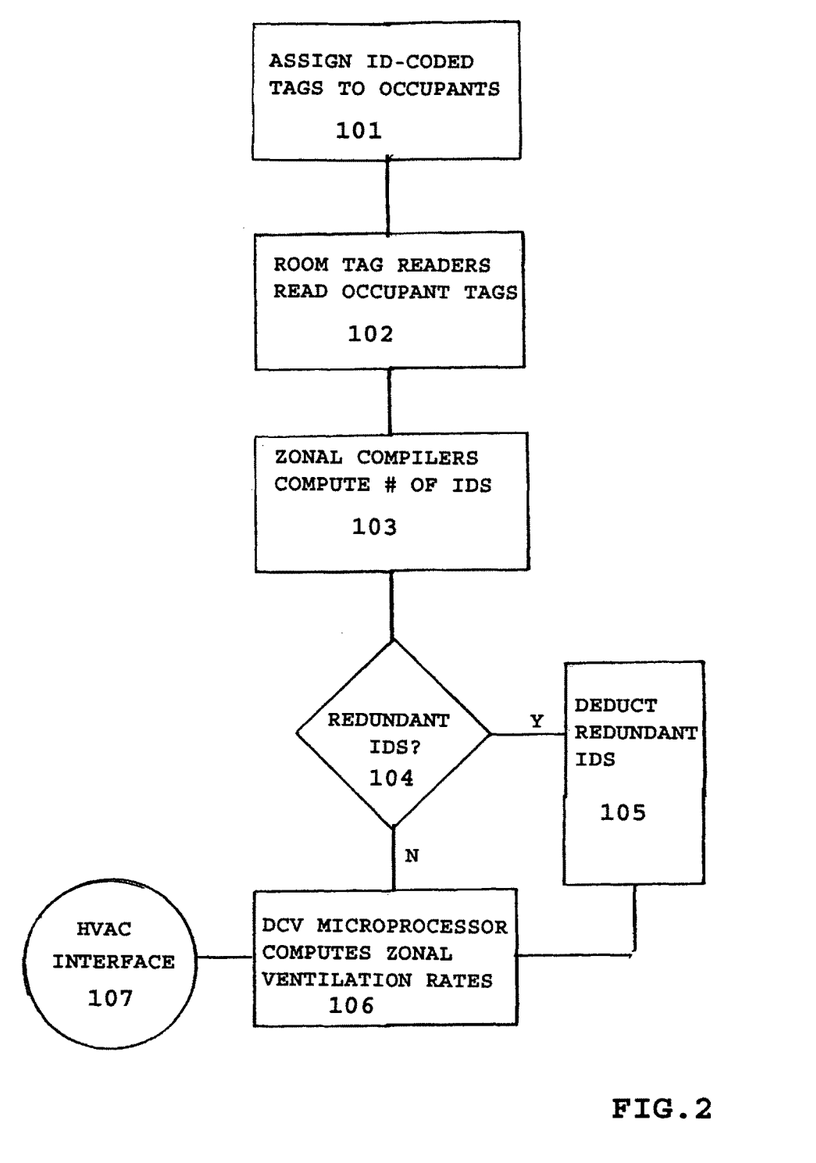
FIG. 2 is a flow-chart of the process of the passive tag preferred embodiment of the present invention.

Referring to FIG. 2, the process of the first preferred embodiment of the present invention 10 is described by means of a flow chart. The process comprises the following steps:

- 101: Assigning to each building occupant and visitor a wearable ID badge 16 containing an ID-coded passive RFID tag 15;
- 102: Providing in each room 12 a tag reader 13 that detects each occupant's RFID tag 15 within the room 12 and wirelessly transmits the ID-code associated with each detected tag 15 to a zonal compiler 19;
- 103: Providing in each ventilation zone 11 of the building a zonal compiler 19, which receives the ID-code transmissions 18 from the tag readers 13 of all rooms 12 within the zone 11, and next, after discounting redundant ID-codes (104-105) computes an occupancy count for the zone, and then transmits the zonal occupancy count to a central DCV microprocessor 21; and
- 106: Providing a central DCV microprocessor 21 that receives the zonal occupancy count from each ventilation zone 11 in the building and, depending on the type of use in the zone, computes a ventilation rate for the zone, and then implements that ventilation rate (107) through an interface 22 with the ventilation rate controls of the building HVAC system.

Figure 3:
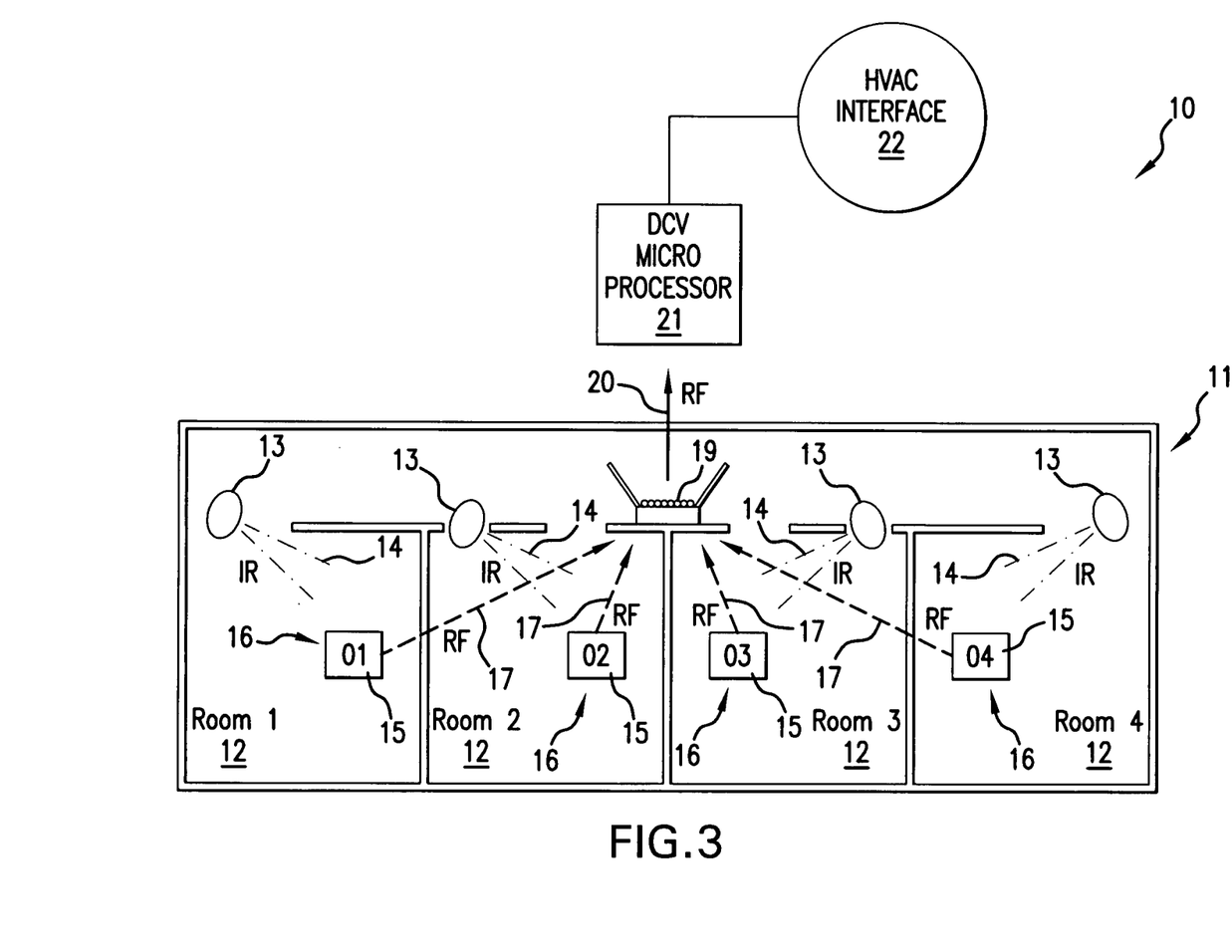
FIG. 3 is a schematic diagram of the apparatus of the active tag preferred embodiment of the present invention.

FIG. 3 depicts a schematic apparatus configuration of the second preferred embodiment of the present invention 10, which uses active tags. For illustrative purposes, this figure focuses on one ventilation zone 11 of a building that has multiple ventilation zones. The same basic apparatus configuration would be replicated in the other ventilation zones of the building. The exemplary ventilation zone 11 comprises four rooms 12, which are labeled Rooms 1-4. Obviously, depending on the floor plan and ventilation system of the building, each ventilation zone 11 can have more or fewer rooms 12 than are depicted in this figure. Hence, the number of rooms 12 indicated here is for illustrative purposes only.

In each room 12, there are one or more detectors that are IR emitters 13. Preferably, there is one IR emitter 13 per room 12, but multiple IR emitters 13 may be required for rooms that are very large and/or have very complex configurations. In the preferred embodiment 10, the IR emitter(s) 13 in each room 12 continuously emit(s) IR search signals 14 throughout the room 12. The IR search signals 14 include a controlled space code identifying the particular room 12 in which the source IR emitter 13 is located. The IR search signals 14 are received by active RFID tags 15 implanted in ID badges 16 issued to all building occupants and visitors. The RFID tags 15 respond to the IR search signals 14 by transmitting RF tag signals 17 to a zonal compiler 19. The tag signal 17 for each RFID tag 15 transmits a digital ID code assigned to the particular ID badge 16 in which the RFID tag 15 is implanted, as well as the controlled space code received via the IR search signals 14, which identifies the room 12 in which the tag 15 has been detected.

The RFID tags 15 in each room 12 continuously transmit tag signals 17 to a zonal compiler 19 that is assigned to the ventilation zone 11 in which the room 12 is located. Each tag signal 17 transmits two digital codes: first, a controlled space code uniquely identifying the room 12 in which the tag 15 is located, and second, the ID code of the tag 15 itself. Using this data, the zonal compiler 19 registers a zonal occupancy count based on the number of ID codes received, discounting redundant ID codes. The zonal compiler 19 then transmits the zonal occupancy counts digitally via an RF compiler signal 20 sent to a central demand control ventilation (DCV) microprocessor 21. The DCV microprocessor 21 wirelessly interfaces with the zonal compilers 19 of all the ventilation zones 11 within the building.

Using the zonal occupancy count received from each zonal compiler 19, the DCV microprocessor 21 computes the demand ventilation rate based on the applicable ASHRAE algorithms and standards for the use(s) associated each ventilation zone 11. The DCV microprocessor 21 then relays or transmits the computed ventilation rate to an HVAC interface 22, which interfaces with the building HVAC system so as to implement the demand ventilation rate.

Figure 4:
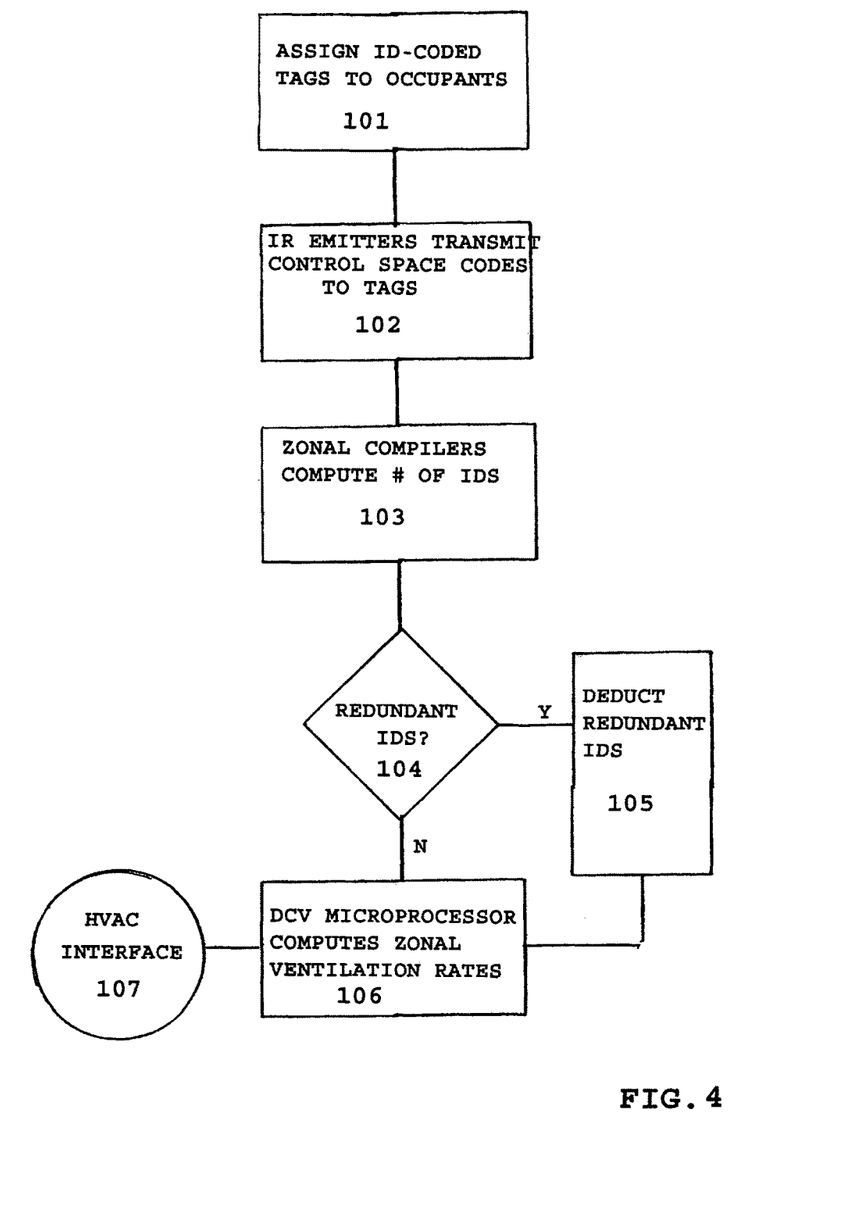
FIG. 4 is a flow-chart of the process of the active tag preferred embodiment of the present invention.

Referring to FIG. 4, the process of the second preferred embodiment of the present invention 10 is described by means of a flow chart. The process comprises the following steps:

101: Assigning to each building occupant and visitor a wearable ID badge 16 containing an ID-coded active RFID tag 15;

102: Providing in each room 12 an IR emitter 13 that detects each occupant's RFID tag 15 within the room 12 and wirelessly transmits to each tag 15 the controlled space code associated with the room 12 in which the tag 15 has been detected;

103: Providing in each ventilation zone 11 of the building a zonal compiler 19, which receives from each of the tags 15 in all rooms 12 within the zone 11 a continuous wireless transmission containing both the ID code of each tag 15 and the controlled space code for the room in which the tag 15 has been detected;

104-105: After discounting redundant ID-codes, the zonal compiler 19 computes an occupancy count for the zone, and then transmits the zonal occupancy count to a central DCV microprocessor 21; and 106: Providing a central DCV microprocessor 21 that receives the zonal occupancy count from each ventilation zone 11 in the building and, depending on the type of use in the zone, computes a ventilation rate for the zone, and then implements that ventilation rate (107) through an interface 22 with the ventilation rate controls of the building HVAC system.

Although the preferred embodiments of the present invention have been disclosed for illustrative purposes, those skilled in the art will appreciate that many additions, modifications and substitutions are possible, without departing from the scope and spirit of the present invention as defined by the accompanying claims.

What is claimed is:

1. A system for adjusting a ventilation rate of each of a plurality of ventilation zones within a building occupied by a plurality of occupants, the system comprising:
   (a) a plurality of tags, each tag of the plurality of tags having a digital ID code that is assigned to a corresponding occupant of the plurality of occupants, wherein a ventilation zone of the plurality of ventilation zones includes a first room and a second room;
   (b) a first one or more tag detectors for detecting a first subset of tags of the plurality of tags located in the first room during a time interval, and a second one or more tag detectors for detecting a second subset of tags of the plurality of tags located in the second room during the time interval;
   (c) a plurality of zonal compilers assigned to the plurality of ventilation zones and including a zonal compiler assigned to the ventilation zone, the zonal compiler configured to:
      communicate wirelessly with the first one or more tag detectors and the second one or more tag detectors, and/or with the first subset of tags and the second subset of tags to thereby wirelessly acquire a first group of digital ID codes corresponding to the first subset of tags detected by the first one or more tag detectors during the time interval, and a second group of digital ID codes corresponding to the second subset of tags detected by the second one or more tag detectors during the time interval;
      compare the first group of digital ID codes with the second group of digital ID codes;
      based on said comparison, identify a tag of the first subset of tags as being the same as a tag of the second subset of tags,
      eliminate the identified tag from the second group of digital ID codes to establish a corrected second group of digital ID codes, and
      compute a zonal occupancy count for the zone based on the acquired first group of digital ID codes and the corrected second group of digital ID codes;
   (d) one or more DCV processors for wirelessly interfacing with the plurality of zonal compilers, wherein at least one of the one or more DCV processors is configured to receive the zonal occupancy count from the zonal compiler and compute a zonal ventilation rate based on the received zonal occupancy count and a floor area of the ventilation zone; and
   (e) one or more HVAC interfaces for wirelessly interfacing with the one or more DCV processors, wherein the one or more HVAC interfaces adjusts the ventilation rate for the ventilation zone to conform to the zonal ventilation rate computed by the one or more DCV processors.

2. The system according to claim 1, wherein a first controlled space code is assigned to the first room and a second controlled space code is assigned to the second room, and wherein the first controlled space code is wirelessly communicated by the first one or more tag detectors to each tag of the first subset of tags located in the first room, and wherein each tag of the first subset of tags wirelessly communicates the first controlled space code, along with the tag's digital ID code, to the zonal compiler.

3. The system according to claim 1, wherein one or more of the plurality of zonal compilers incorporates a DCV processor.

4. The system according to claim 2, wherein one or more of the plurality of zonal compilers incorporates a DCV processor.

5. A process for adjusting a ventilation rate of each of a plurality of ventilation zones, each ventilation zone having a determined floor area, within a building occupied by a plurality of occupants, the process comprising the following steps:
   (a) assigning a tag of a plurality of tags to each occupant of the plurality of occupants, each tag of the plurality of tags having a digital ID code;
   (b) providing in the ventilation zone a first one or more tag detectors and a second one or more tag detectors;
   (c) initiating wireless communications during a time interval between the first one or more tag detectors and a first subset of tags of the plurality of tags located in the first room, and between the second one or more tag detectors and a second subset of tags of the plurality of tags located in the second room;
   (d) providing a plurality of zonal compilers assigned to the plurality of ventilation zones and including a zonal compiler assigned to the ventilation zone;
   (e) initiating the zonal compiler to:
      wirelessly communicate with first one or more tag detectors and the second one or more tag detectors, and/or with the first subset of taps and the second subset of tags to thereby acquire a first group of digital ID codes corresponding to the first subset of tags detected by the first one or more tag detectors during the time interval, and a second group of digital ID codes corresponding to the second subset of tags detected by the second one or more tag detectors during the time interval,
      compare the first group of digital ID codes with the second group of digital ID codes, based on said comparison, identify a tag of the first subset of taps as being the same as a tag of the second subset of tags, wherein the identified tag moved between the first room and the second room during the time interval, eliminate the identified tag from the second group of digital ID codes to establish a corrected second group of digital ID codes, and compute a zonal occupancy count for the zone based on the acquired first group of digital ID codes and the corrected second group of digital ID codes;

(f) providing one or more DCV processors;

(g) initiating communications between the one or more DCV processors and the plurality of zonal compilers, whereby at least one of the one or more DCV processors is configured to receive the zonal occupancy count from the zonal compiler and compute a zonal ventilation rate based on the received zonal occupancy count and a floor area of the ventilation zone;

(h) providing one or more HVAC interfaces; and (i) interfacing the one or more HVAC interfaces with the one or more DCV processors, such that the one or more HVAC interfaces adjust the ventilation rate for the ventilation zone to conform to the zonal ventilation rate computed by the one or more DCV processors.

6. The process according to claim 5, comprising the further steps of assigning a first controlled space code to the first room and a second controlled space code to the second room, and wirelessly communicating the first controlled space code by the first one or more tag detectors to each tag of the first subset of tags located in the first room, and wirelessly communicating the first controlled space code by each tag of the first subset of tags, along with the tag's digital ID code, to the zonal compiler.

7. The process according to claim 5, wherein one or more of the plurality of zonal compilers incorporates a DCV processor.

8. The process according to claim 6, wherein one or more of the plurality of zonal compilers incorporates a DCV processor.

* * * * *